United States Patent
McCarville et al.

(10) Patent No.: US 8,834,667 B2
(45) Date of Patent: Sep. 16, 2014

(54) METHOD FOR JOINING SANDWICH TRUSS CORE PANELS AND COMPOSITE STRUCTURES PRODUCED THEREFROM

(75) Inventors: Douglas A. McCarville, Orting, WA (US); Juan C. Guzman, Seattle, WA (US); Michael Leslie Hand, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 101 days.

(21) Appl. No.: 12/907,329

(22) Filed: Oct. 19, 2010

(65) Prior Publication Data

US 2012/0090265 A1    Apr. 19, 2012

(51) Int. Cl.
| | |
|---|---|
| *B29C 65/48* | (2006.01) |
| *B32B 3/20* | (2006.01) |
| *B29C 65/00* | (2006.01) |
| *B29C 65/50* | (2006.01) |
| B29L 31/30 | (2006.01) |
| B29L 31/00 | (2006.01) |
| B64C 1/00 | (2006.01) |
| B64C 1/06 | (2006.01) |

(52) U.S. Cl.
CPC ......... *B29C 66/72523* (2013.01); *Y02T 50/433* (2013.01); *Y02T 50/43* (2013.01); *B29L 2031/3082* (2013.01); *B29L 2031/7172* (2013.01); *B29L 2031/3097* (2013.01); *B29C 66/547* (2013.01); *B29C 66/929* (2013.01); *B29C 66/919* (2013.01); *B29C 65/505* (2013.01); *B29C 66/496* (2013.01); *B29C 66/543* (2013.01); *B29C 66/636* (2013.01); *B29C 66/81455* (2013.01); *B29C 66/301* (2013.01); *B29C 66/43* (2013.01); *B64C 2001/0072* (2013.01); *B64C 1/069* (2013.01)

USPC ................. 156/304.3; 156/304.2; 156/304.5; 156/304.6; 156/182; 244/131

(58) Field of Classification Search
CPC .... B29C 65/48; B29C 65/4835; B29C 65/50; B29C 65/5057; B29C 66/022; B29C 66/0224; B29C 66/02241; B29C 66/02245; B29C 66/05; B29C 66/10; B29C 66/114; B29C 66/1142; B29C 66/14; B29C 66/721; B29C 66/723; B29C 66/72523; B32B 3/12; B32B 3/18; B32B 3/20

USPC ............. 156/304.2, 304.3, 304.5, 304.6, 182; 244/131

See application file for complete search history.

(56) References Cited

U.S. PATENT DOCUMENTS

| 3,240,644 | A | | 3/1966 | Wolfe | |
|---|---|---|---|---|---|
| 3,301,732 | A | * | 1/1967 | Kunz | ..................... 156/304.3 |

(Continued)

FOREIGN PATENT DOCUMENTS

| EP | 0282337 A2 | 9/1988 |
|---|---|---|
| EP | 0373729 A2 | 6/1990 |

(Continued)

OTHER PUBLICATIONS

Black, "Fiber Placement The Centerpiece of NCAM," Composites World, http://www.compositesworld.com/articles/fiber-placement-the-centerpiece-of-ncam, Jan. 1, 2004, 4 pages.

(Continued)

*Primary Examiner* — Michael Tolin
(74) *Attorney, Agent, or Firm* — Yee & Associates, P.C.

(57) ABSTRACT

Fluted core sandwich panels are joined together to form a composite structure. Variations in panel ends are accommodated by a core stiffener insert installed in a joint between ends of the panels.

20 Claims, 8 Drawing Sheets

(56) References Cited

U.S. PATENT DOCUMENTS

| | | | |
|---|---|---|---|
| 3,319,274 | A | 5/1967 | Upton |
| 3,339,326 | A | 9/1967 | Deer |
| 3,432,859 | A | 3/1969 | Jordan |
| 3,544,417 | A | 12/1970 | Corzine |
| 3,573,144 | A | 3/1971 | Andersen |
| 3,658,612 | A | 4/1972 | Corzine |
| 3,732,138 | A | 5/1973 | Almog |
| 3,779,487 | A | 12/1973 | Ashton et al. |
| 3,795,559 | A | 3/1974 | Horn |
| 3,885,071 | A | 5/1975 | Blad et al. |
| 3,943,980 | A | 3/1976 | Rheaume |
| 3,965,942 | A | 6/1976 | Hatch |
| 4,051,289 | A | 9/1977 | Adamson |
| 4,055,268 | A | 10/1977 | Barthel |
| 4,132,577 | A | 1/1979 | Wintermantel |
| 4,154,363 | A | 5/1979 | Barthel |
| 4,156,054 | A * | 5/1979 | Gurewitsch .................. 428/583 |
| 4,177,306 | A * | 12/1979 | Schulz et al. ................ 428/107 |
| 4,223,053 | A | 9/1980 | Brogan |
| 4,366,917 | A | 1/1983 | Kotcharian |
| 4,461,398 | A | 7/1984 | Argy |
| 4,617,072 | A | 10/1986 | Merz |
| 4,726,707 | A | 2/1988 | Newton |
| 4,835,975 | A | 6/1989 | Windecker |
| 5,025,943 | A | 6/1991 | Forsman |
| 5,061,542 | A | 10/1991 | Brace |
| 5,118,555 | A | 6/1992 | Horovitz |
| 5,150,812 | A | 9/1992 | Adams |
| 5,419,139 | A | 5/1995 | Blum |
| 5,469,686 | A | 11/1995 | Pykiet |
| 5,538,589 | A * | 7/1996 | Jensen et al. ................ 156/581 |
| 5,700,545 | A | 12/1997 | Audi et al. |
| 5,879,498 | A | 3/1999 | Lemons |
| 5,904,972 | A | 5/1999 | Tunis, III et al. |
| 6,178,754 | B1 | 1/2001 | Dujarric |
| 6,207,256 | B1 | 3/2001 | Tashiro |
| 6,375,125 | B1 | 4/2002 | Kirn |
| 6,592,704 | B1 | 7/2003 | Benzing, II |
| 6,743,504 | B1 | 6/2004 | Allen et al. |
| 7,296,769 | B2 | 11/2007 | Hogenson |
| 7,998,299 | B2 | 8/2011 | McCarville et al. |
| 2010/0043955 | A1 * | 2/2010 | Hornick et al. ............... 156/182 |
| 2010/0065688 | A1 * | 3/2010 | Wood ............................ 244/131 |
| 2010/0080941 | A1 | 4/2010 | McCarville et al. |
| 2010/0080942 | A1 * | 4/2010 | McCarville et al. ......... 428/34.1 |
| 2010/0116938 | A1 * | 5/2010 | Kline et al. ................... 244/131 |
| 2011/0300343 | A1 | 12/2011 | McCarville et al. |

FOREIGN PATENT DOCUMENTS

| | | |
|---|---|---|
| EP | 0628406 A2 | 12/1994 |
| EP | 2444238 A2 | 4/2012 |
| FR | 2872085 A1 | 12/2005 |
| WO | 9222053 A1 | 12/1992 |
| WO | 2010040004 A1 | 4/2010 |

OTHER PUBLICATIONS

Black, An Update on Composite Tanks for Cryogens,: Composites World, http://www.compositesworld.com/articles/an-update-on-composite-tanks-for-cryogens, Nov. 1, 2005, 5 pages.

International Search Report, dated Jan. 14, 2010, regarding Application No. PCT/US2009-059290 (WO2010040004), 5 pages.

USPTO Office Action, dated Dec. 9, 2010, regarding U.S. Appl. No. 12/243,926, 9 pages.

USPTO Notice of Allowance, dated Apr. 19, 2011, regarding U.S. Appl. No. 12/243,926, 8 pages.

USPTO Office Action, dated Mar. 30, 2011, regarding U.S. Appl. No. 12/398,138, 14 pages.

USPTO Final Office Action, dated Oct. 14, 2011, regarding U.S. Appl. No. 12/398,138, 14 pages.

USPTO Office Action, dated Nov. 14, 2011, regarding U.S. Appl. No. 13/211,166, 7 pages.

USPTO Final Office Action, dated Jul. 18, 2012, regarding U.S. Appl. No. 13/211,166, 18 pages.

Notice of Allowance, dated Mar. 28, 2014, regarding U.S. Appl. No. 12/398,138, 30 pages.

* cited by examiner

METHOD FOR JOINING SANDWICH TRUSS CORE PANELS AND COMPOSITE STRUCTURES PRODUCED THEREFROM

CROSS REFERENCE TO RELATED APPLICATIONS

This application is related to co-pending U.S. patent application Ser. Nos. 12/243,926 filed Oct. 1, 2008 and 12/398,138 filed Mar. 4, 2009, and to Provisional U.S. Patent Application No. 61/196,242 filed Oct. 16, 2008, the entire disclosures of which are incorporated by reference herein.

TECHNICAL FIELD

This disclosure generally relates to techniques for fabricating composite structures, and deals more particularly with a method of joining sandwich truss core panels, especially curved panels used to form barrel-shaped structures.

BACKGROUND

Large composite structures are sometimes fabricated by joining together composite sandwich panels. For example, in the aerospace industry, curved composite sandwich panels may be joined together to form barrel sections used for space exploration vehicles, fuel tanks and airplane fuselages, to name only a few. In some applications, the panels may be assembled on a cylindrical cure mandrel and then processed in an autoclave to co-cure the panels and form an integrated structure with strong joints between the panels. However, autoclave processing may not be feasible in applications where the dimensions of the composite structure exceed the size of commercially available autoclave equipment.

Out-of-autoclave processes for joining sandwich truss core panels to form large composite structures have been developed as described in U.S. patent application Ser. No. 12/243, 926 filed Oct. 1, 2008, and Ser. No. 12/398,138 filed Mar. 4, 2009. These prior applications disclose processes for joining pre-cured sandwich panels having fluted truss type cores using adhesively bonded scarf joints. In order to produce a barrel section using these panels, the core flutes must substantially "match-up" at the panel joints in order avoid areas where the structure has less than the desired shear and stiffness capability. Matching up the core flutes may be difficult in a manufacturing environment because as the panels are placed on the mandrel and joined together, the position of the flutes of adjoining panels in the final joint may vary in location for a number of reasons, including variations in accumulated manufacturing tolerances. This variability may lead to a condition where the position of the final core flute in the last joint is too far from the joint centerline to maintain the desired shear and stiffness capability relative to the remainder of the panel.

Accordingly, there is a need for a method of forming joints between sandwich panels employing fluted cores which accommodate variations in the location of the panel ends relative to the final joint centerline. There is also a need for a method of fabricating curved composite structures formed by truss core panels connected together by such joints.

SUMMARY

The disclosed embodiments provide an out-of-autoclave method for joining the ends of composite panels, and particularly curved panels that are joined together to form barrel type or similar curved composite structures. The panel joint formed by the disclosed method accommodates variations in the spacing of panel ends from a joint centerline and/or a range of mate-up conditions between adjoining panel ends, due to tooling variations, flute fit-up, material thickness variations and other variables. Varying circumferential flute-to-flute fit-up conditions can be accommodated by minor modification of panel ends, a core stiffener insert and/or the scarf splices. The disclosed method for forming panel joints may reduce or eliminate the need for local pad-ups, thick splices, potting and fasteners. Accordingly, the panel joint produced by the disclosed method may reduce the weight of the composite structure and/or reduce the time, material and labor required to form the joints.

The disclosed method allows joining panels in an out-of-autoclave process which is relatively simple, repeatable and cost effective. Challenging flute-to-flute bonding is reduced or eliminated through the use of a pre-cured core stiffener insert installed in the joint. The method allows mate-up of adjoining panels regardless of how the flutes and/or panel ends come together. Inboard and outboard scarf splices used in the joint can be pre-cured to substantially identical geometries, and the layup of the installed stiffeners, as well as their geometry and angularity can be optimized for a given application. The core stiffener insert can be premade and cut to a desired width during the final panel fit-up, thereby simplifying the fit-up process. The panel joints can be located using relatively simple tooling which may result in the joint outer mold line surfaces being relatively smooth.

According to one disclosed embodiment, a curved composite structure comprises first and second composite panels each having an end, and a joint coupling the ends of the panels together. Each of the panels includes first and second facesheets and a fluted core sandwiched between the facesheets. The joint includes a core stiffener insert configured to accommodate variations in the panel ends. The core stiffener insert may include one of a substantially 90 degree I-beam, a canted I-beam and a double legged truss number. The joint further includes first and second scarf splices each of which is joined to the core stiffener insert.

According to another disclosed embodiment, a composite structure comprises a plurality of curved panels joined together to form a closed curved cross section. Each of the panels includes a core sandwiched between a pair of facesheets. A joint between at least two of the panels includes a core stiffener insert configured to match-up the cores of the two panels. The joint further includes scarf splices bonded to the core stiffener insert and to the facesheets of the two panels. The core stiffener insert is bonded to portions of the cores of the two panels and may be substantially symmetric about a centerline passing through the joint.

According to a further embodiment, a method is provided of fabricating a composite structure. The method comprises forming first and second panels each having a fluted core and an end wherein the fluted cores are mismatched at the panel ends. The method further comprises altering the panel ends to match-up the cores and joining the altered panel ends together. Altering panel ends may include removing a portion of the end of the core of at least one of the panels such that the core ends are matched to each other. Joining the panel ends includes installing a core stiffener insert between the matched core ends.

According to still another embodiment, a method is provided of fabricating a composite structure comprising providing two composite panel ends and joining the panel ends with a core stiffener insert. Each of the composite panels includes a fluted core sandwiched between first and second facesheets, wherein the ends of the cores are mismatched. The core stiffener insert mates the mismatched core ends and transfers loads between the facesheets and across the panels. The method may further comprise matching the core ends to the core stiffener insert by removing at least a portion of one of the core ends. The method may further comprise installing a first splice between the first facesheets of the panels, and installing a second splice between the second facesheets of the panels. The first and second splices are bonded with the core stiffener insert.

BRIEF DESCRIPTION OF THE ILLUSTRATIONS

DETAILED DESCRIPTION

Figure 1:
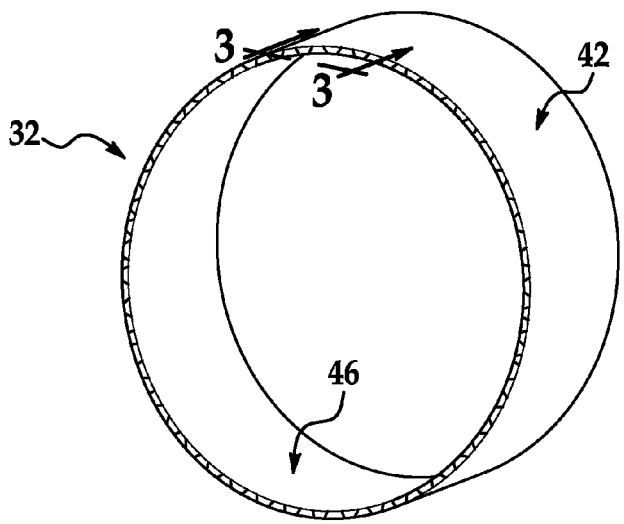
FIG. 1 is an illustration of a perspective view of a composite barrel section.
Figure 2:
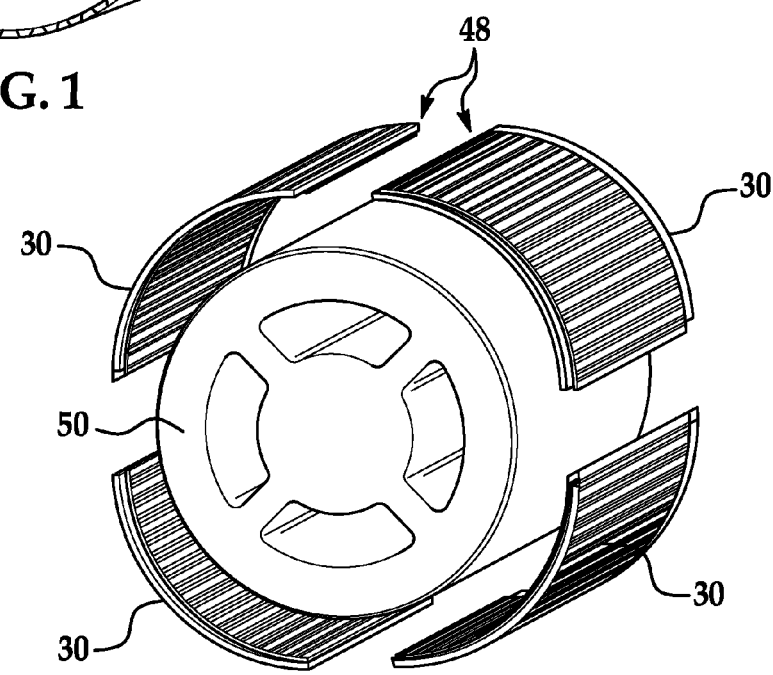
FIG. 2 is an illustration of a perspective view of composite panels being joined together over a mandrel to form the barrel section of FIG. 1.
Figure 3:
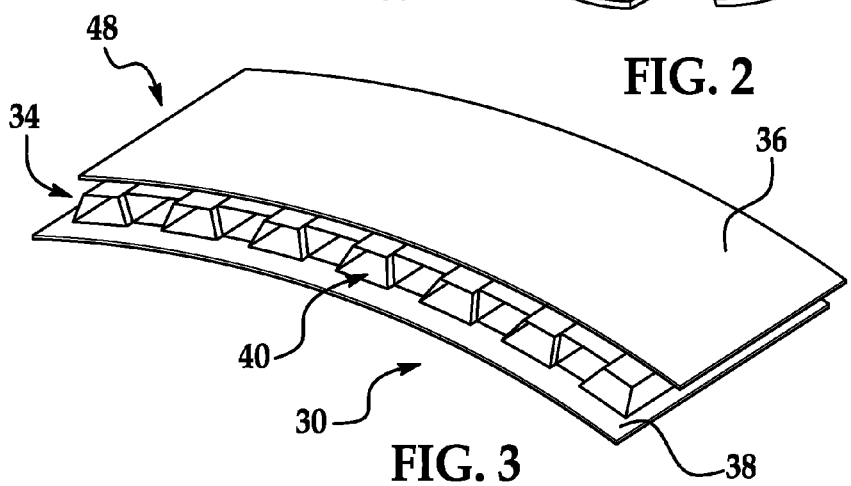
FIG. 3 is an illustration of a perspective view of one of the panels shown in FIG. 2.

Referring first to FIGS. 1-3, a curved composite structure 32 may be fabricated by joining together a plurality of curved composite sandwich panels 30 along their outer ends 48. As used herein, "curved" refers to a structure that may include one or more curves or contours which may be regular or irregular, and/or continuous or discontinuous. In the illustrated embodiment, the composite structure 32 comprises a barrel section which may be used, for example and without limitation in the aerospace industry to form space exploration vehicles, lifting bodies, fuel tanks and a aircraft fuselage, to name only a few. While a barrel shaped composite structure 32 is shown in the exemplary embodiment, it is to be understood that a variety of other shapes of curved composite structures with closed curved cross sections may be fabricated using the disclosed method, particularly those that may be too large in scale to be placed in an autoclave for processing. It may also be possible to use the disclosed method to fabricate curved composite structures that do not have closed cross sections, where it is necessary to join panel ends that may not mate-up.

Each of the panels 30 comprises a fluted core 34, also sometimes referred to herein as a truss core, sandwiched between first and second composite facesheets 36, 38. The composite sandwich panels 30 may be similar to those described in U.S. patent application Ser. Nos. 12/243,926 filed Oct. 1, 2008, now issued as U.S. Pat. Nos. 7,998,299, and 12/398,138 filed Mar. 4, 2009, the entire disclosures of which are incorporated by reference herein. The sandwich panels 30 may be pre-cured using autoclave or other suitable processing techniques and are placed on a mandrel 50 or other tool used to support the panels 30 during assembly. Other forms of tooling may be used to locate and position the panels during assembly, such as rings (not shown). As will be discussed below in more detail, the panel ends 48 are bonded together in an out-of-autoclave process using a suitable adhesive film (not shown) that is cured at elevated temperature, referred to sometimes as "hot bonding". Following assembly of the panels 30, the facesheets 36, 38 respectively form outboard and inboard surfaces 42, 46 (FIG. 1) of the composite structure 32.

Figure 4:
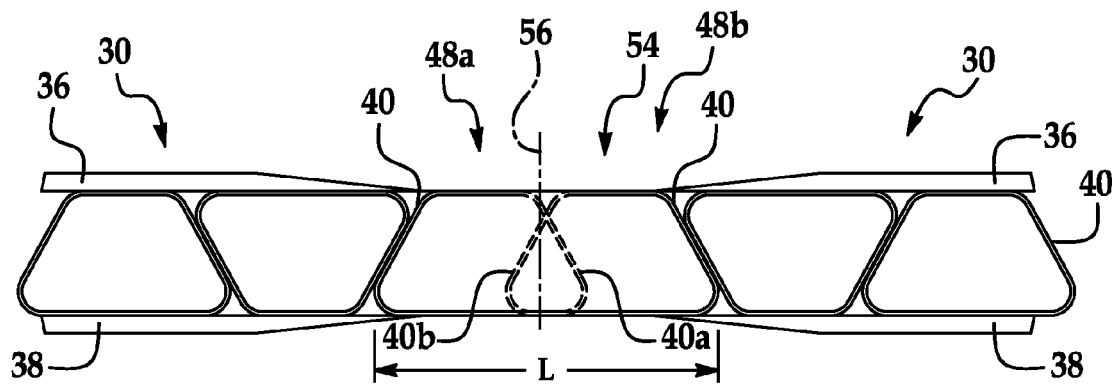
FIG. 4 is an illustration of a sectional view of two panel ends connected by a joint having a center span that may be too large to maintain the desired panel stiffness.
Figure 5:
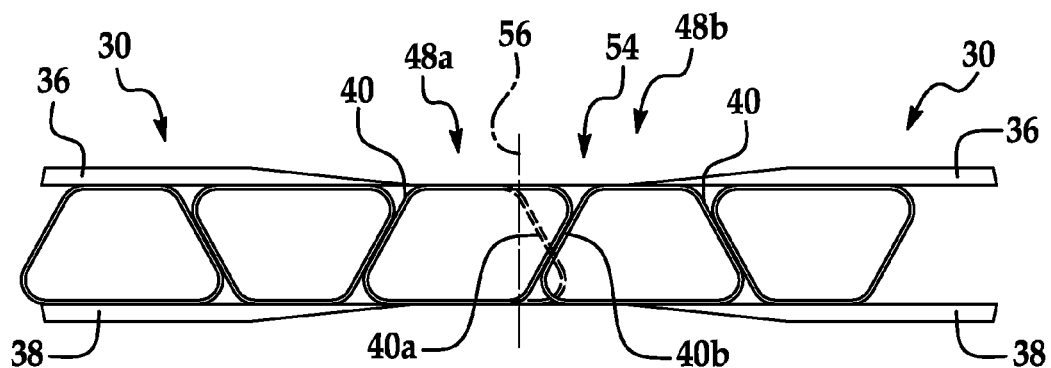
FIG. 5 is an illustration similar to FIG. 4 in which the flutes in the panel ends are not symmetric about the centerline of the joint.

Referring now also to FIGS. 4 and 5, during assembly of the panels 30 while on the mandrel 50 shown in FIG. 3, the last set of panel ends 48a, 48b to be joined together may not fit-up or match with each other so as to form a joint 54 that provides the desired shear, stiffness and/or load transfer capability. For example, FIG. 4 illustrates a possible fit-up in which the flutes 40 of the adjoining panel ends 48a, 48b overlap, thus requiring that portions 40a, 40b of the flutes 40 be trimmed away so that they match at the centerline 56 of the joint 54. Although the trimmed flutes 40 are substantially symmetric about the centerline 56, the span "L" across the joint 54 may be too large to maintain desired panel shear, stiffness and/or load transfer ability through the joint 54. FIG. 5 illustrates another example of a mismatch between the panel ends 48a, 48b in which trimming a portion 40a of one of the flutes 40 results in the panel ends 48a, 48b not being centered or symmetric about the centerline 56. This lack of joint symmetry about the centerline 56 may also result in less than desired panel shear, stiffness and/or load transferring ability through the joint 54.

Figure 6:
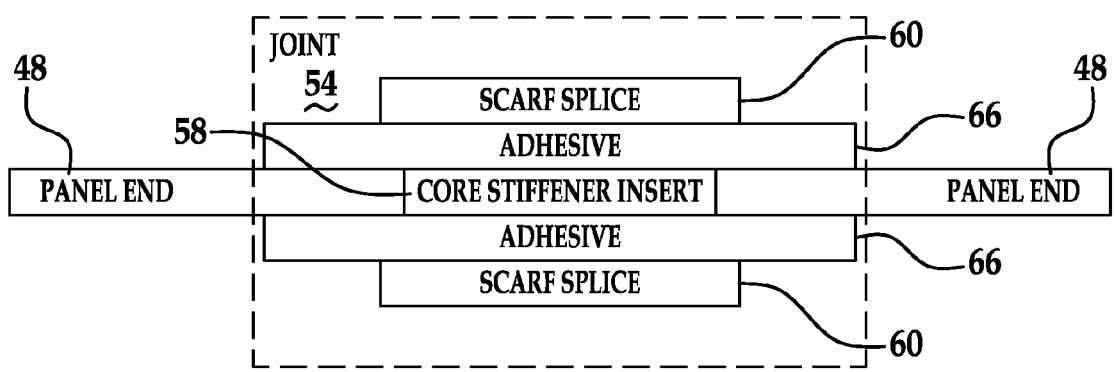
FIG. 6 is an illustration of a functional block diagram of a joint formed between panel ends using the disclosed method.

Referring now to FIG. 6, the disclosed embodiments provide a method of forming a joint 54 between panel ends 48 which maintains the desired panel shear, stiffness and/or load transfer capability in spite of mismatches between the panel ends 48. In order to maintain the desired panel properties in the area of the joint 54, a core stiffener inset 58 is installed between the panel ends 48. The stiffener insert 58 is a pre-cured composite member having a size, shape, ply orientation and angularity that substantially matches or exceeds the stiffness of the panels 30. The composite insert 58 re-establishes shear and stiffness capability in the joint 54 after the panel ends 48 have been trimmed/fitted.

The stiffener insert 58 provides a local mechanism for load transfer between the panels inner and outer facesheets 36, 38. The stiffener insert 58 can be formed of pre-preg tape and/or fabric plies, and upper and lower radius fillers (not shown in FIG. 6). To accommodate the flute and panel ends variations, the inserts 58 may be cured over-wide and trimmed to match the dimensions of the flutes 40 during pre-bond fit-up. Pre-curing the stiffener inserts 58 may eliminate the need for side pressure in the flutes 40 during the bonding process. A pair of composite scarf splices 60 forming part of the joint 54 are adhesively bonded to both panel ends 48 and the stiffener insert 58 by means of a suitable adhesive 66 such as a film adhesive. The scarf splices 60 may be pre-cured or double vacuum debulked and function to carry in-plane tension and compression loads through the joint 54. Scarf steps 94 (FIG. 16) formed on the facesheets 36, 38 help minimize end of joint load concentration.

Figure 7:
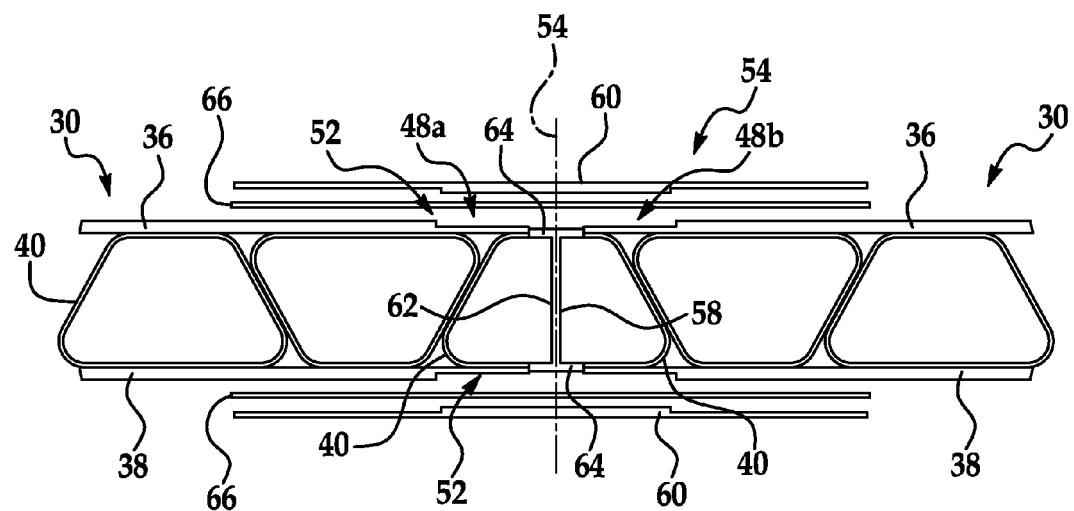
FIG. 7 is an illustration of a sectional view of panel ends joined together in accordance with the disclosed method, parts of the joint being exploded for clarity.

FIG. 7 illustrates a typical core stiffener insert 58 having the cross sectional shape of a 90 degree I-beam, comprising a pair of flanges 64 connected by a web 62. In this example, the stiffener insert 58 is installed between adjacent flutes 40 of panel ends 48 which have been trimmed so as to be symmetric about the centerline 56 of the joint 54. Portions 52 of the facesheets 36, 38 have been ramped to receive tapered scarf splices 60 which overlie and are bonded to facesheets 36, 38, and to the flanges 64 of the stiffener insert 58.

Figure 8:
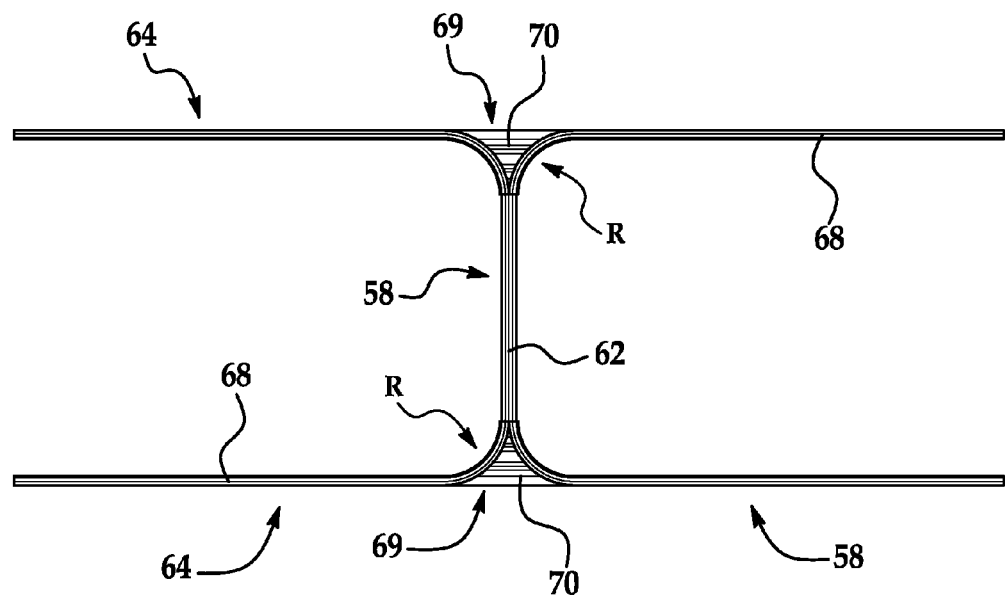
FIG. 8 is an illustration of a cross sectional view of an I-beam form of the core stiffener insert.

FIG. 8 illustrates one form of a core stiffener insert 58 having a substantially I-shaped cross section formed by two C-shaped channels 68 arranged back-to-back. The back-to-back arrangement of the C-channels 68 form the flanges 64 and web 62 of the core stiffener insert 58. Each of the channels 68 may be formed from multiple laminated plies of composite tape or fabric formed over a tool (not shown) and then cured. Each of the channels 68 may have radius corners R forming voids 69 filled with radius fillers 70, sometimes referred to as "noodles" which may be fabricated, for example and without limitation from laminated strips of composite tape.

Figure 9:
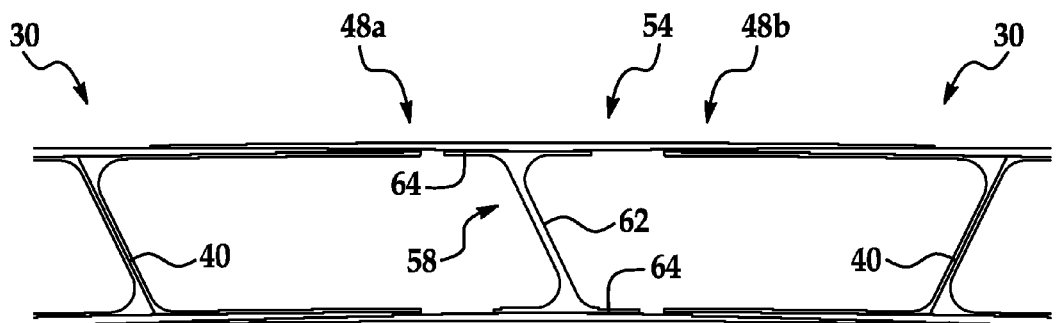
FIG. 9 is an illustration of panel ends joined together by a joint employing a canted I-beam as a core stiffener insert.

FIG. 9 illustrates another form of the core stiffener insert 58 that is designed to substantially match the stiffness of the flutes 40. The insert 58 has a cross sectional shape that is sometimes referred to as a canted I-beam in which the web 62 is non-perpendicular relative to the outer flanges 64. The canted form of the stiffener insert 58 may be used to avoid excess local joint stiffness that may otherwise create an undesirable loading condition.

Figure 10:
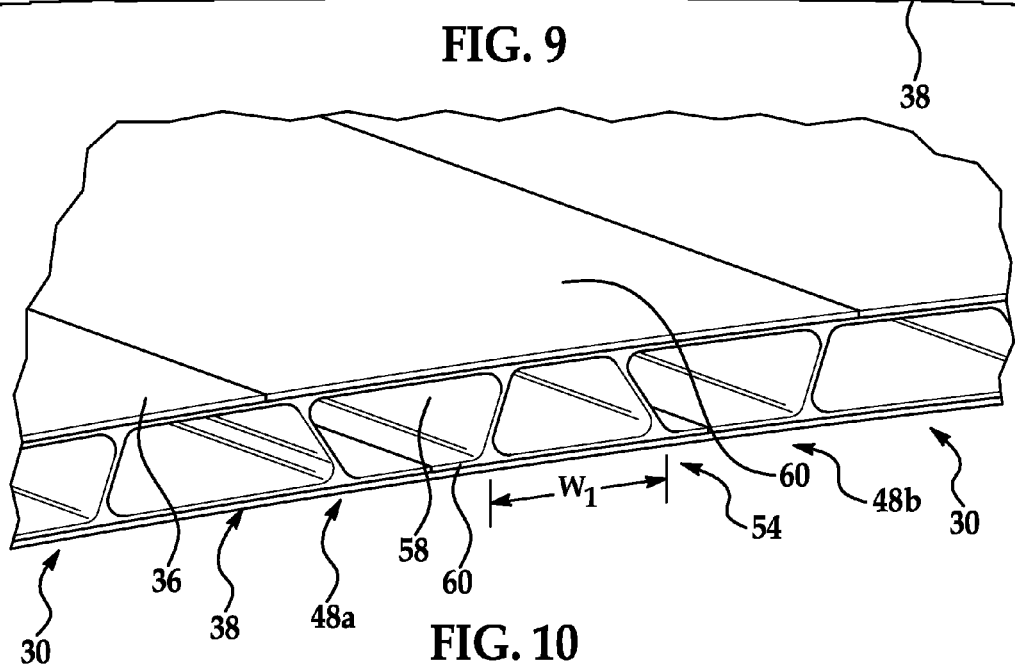
FIG. 10 is an illustration of a perspective, sectional view of panel ends joined by a multi-leg truss core stiffener insert.
Figure 11:
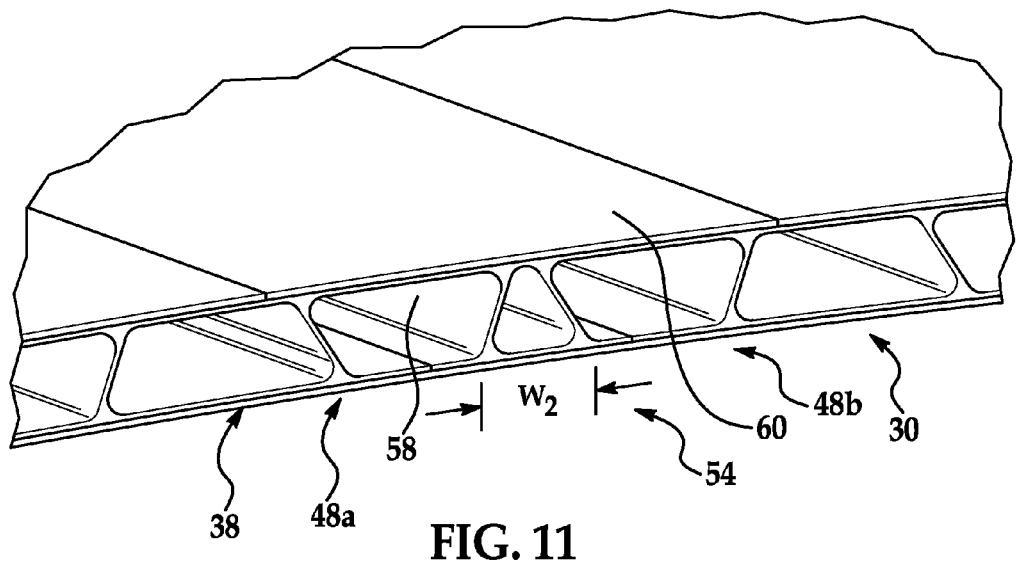
FIG. 11 is an illustration similar to FIG. 10 but showing a multi-leg truss core stiffener having a narrower width.

FIGS. 10 and 11 illustrate further examples of the core stiffener insert 58 having a cross section forming a multi-leg truss having a width $W_1$, $W_2$ that is selected to fit the particular size of the of the joint 54 between adjacent panel ends 48a, 48b.

Figure 12:
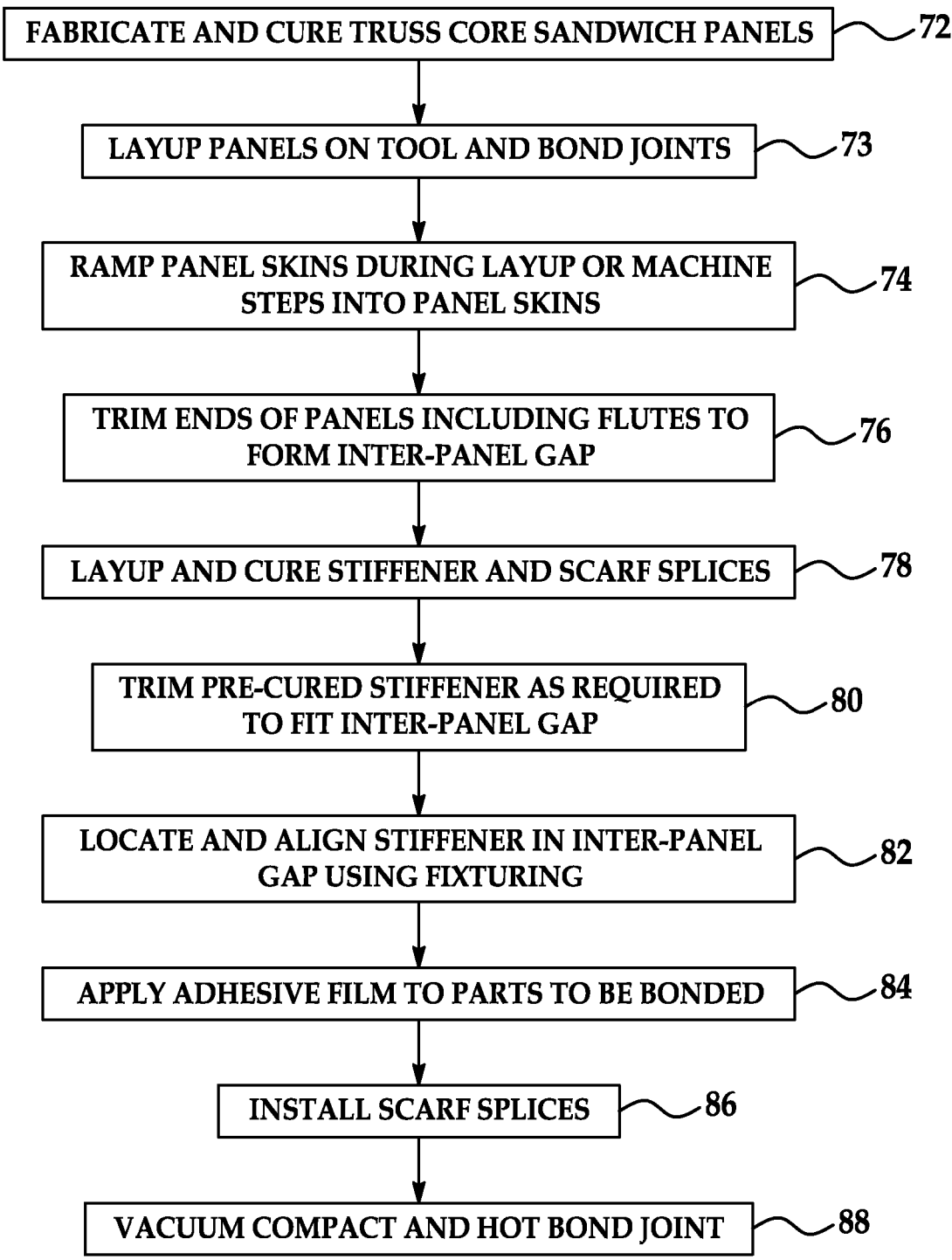
FIG. 12 is an illustration of a flow diagram of a method for joining sandwich truss core panels.
Figure 13:
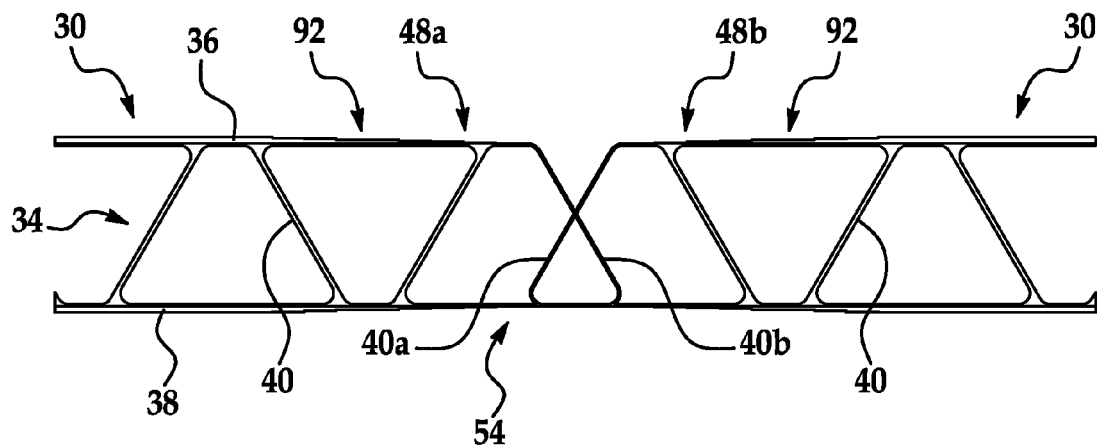
FIG. 13 is an illustration of panel ends prior to being trimmed.

Attention is now directed to FIGS. 12-18 which illustrate the steps of a method of forming the joint 54 between panel ends 48 in accordance with the disclosed embodiments. Beginning at step 72 (FIG. 12) the truss core sandwich panels 30 are fabricated and cured by autoclave or other suitable forms of curing techniques. Next, at 73, the cured panels 30 are laid up over a tool such as the mandrel 50 (FIG. 2), or placed within a locating ring (not shown), and the panel ends 48 are bonded together using, for example and without limitation, the hot bonding process previously described. In the event that a mismatch occurs between the panel ends 48 of the final joint 54, such as where portions 40a, 40b of the panel ends overlap as shown in FIG. 13, then the panel ends 48a, 48b are altered as described as previously above in preparation for the installation of a core stiffener insert 58 specifically configured to fit the final joint 54. Alteration of the panel ends 48 begins at step 74 in which the multi-ply facesheets 36, 38 are ramped at 92 in FIG. 13. Ramping the panel skins 36, 38 may be achieved either by forming steps using ply drop-offs (see FIG. 16) when the facesheets 36, 38 are laid up, or by machining the steps 92 into the facesheets 36, 38 in the area of the joint 54.

Figure 14:
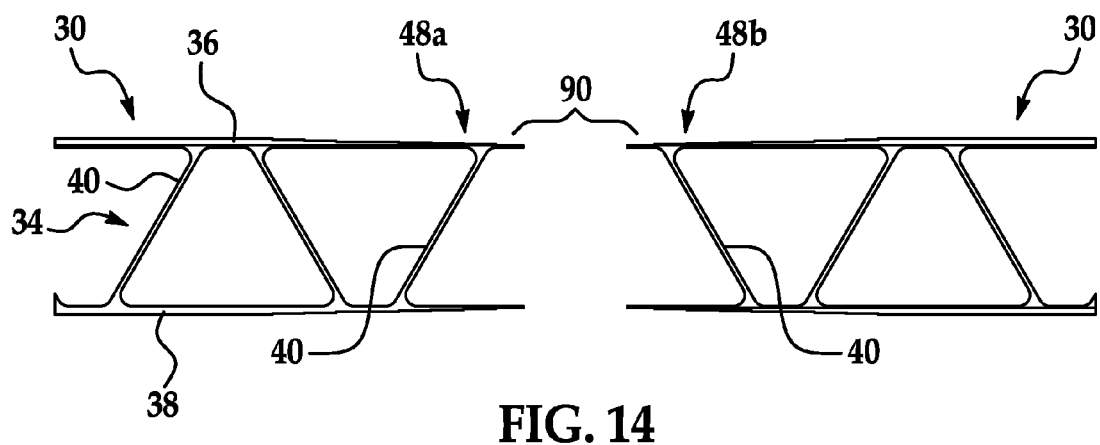
FIG. 14 is an illustration similar to FIG. 13 but showing the flutes of panel ends having been trimmed.
Figure 15:
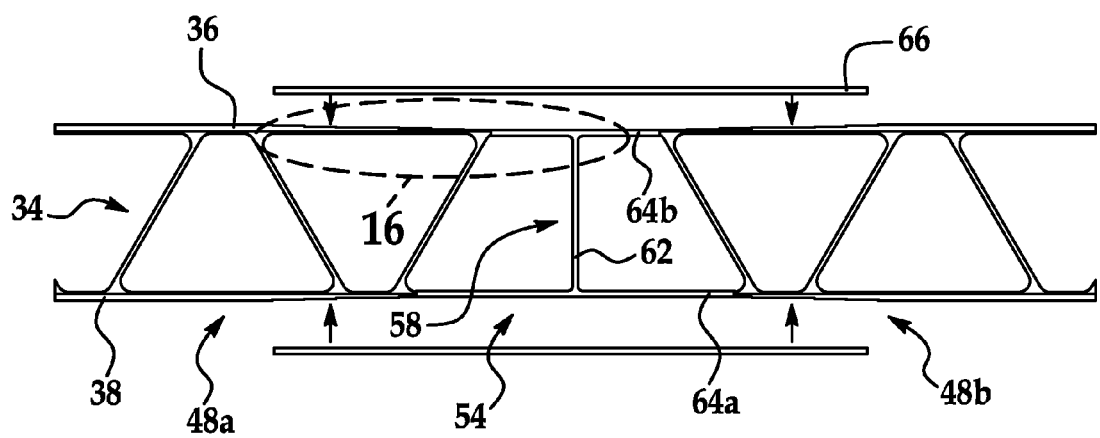
FIG. 15 is an illustration similar to FIG. 14 but showing a core stiffener insert having been installed between the panel ends.
Figure 16:
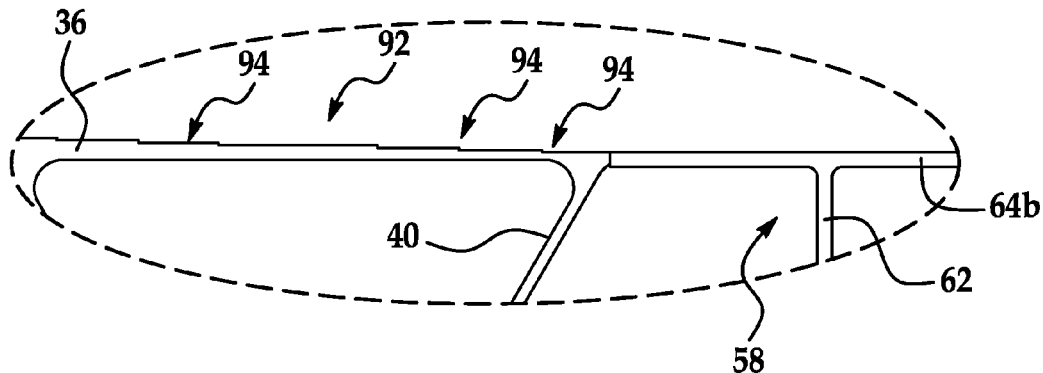
FIG. 16 is an illustration of the area designated as FIG. 16 in FIG. 15.

Next, at step 76, portions 40a, 40b of the flutes 40 in the area of the joint 54 (FIG. 13) are trimmed away so that the panel ends 48a, 48b are cut to form a preselected inter-panel gap 90 shown in FIG. 14 that substantially matches the core stiffener insert 58. At step 78, the core stiffener insert 58 and the scarf splices 60 are laid up and cured. The geometry and size of both the stiffener insert 58 and the scarf splices 60 are be configured to match the dimensions and geometry of the panel ends 48a, 48b following the trimming process, including the inter-panel gap 90. In some cases, as shown at step 80, the pre-cured stiffener insert 58 may be trimmed as required to fit the inner panel gap 90 as closely as possible. Next, at 82, the core stiffener insert 58 is located and aligned within the inter-panel gap as shown in FIGS. 15 and 16, using suitable fixturing (not shown) which holds the stiffener insert 58 insert in place during the remainder of the bonding process. At 84, a layer of adhesive film 66 (FIG. 15) is placed over ramped portions 94 of the facesheets 36, 38 and the flanges 64a, 64b (FIGS. 15 and 16) of the stiffener insert 58.

Figure 17:
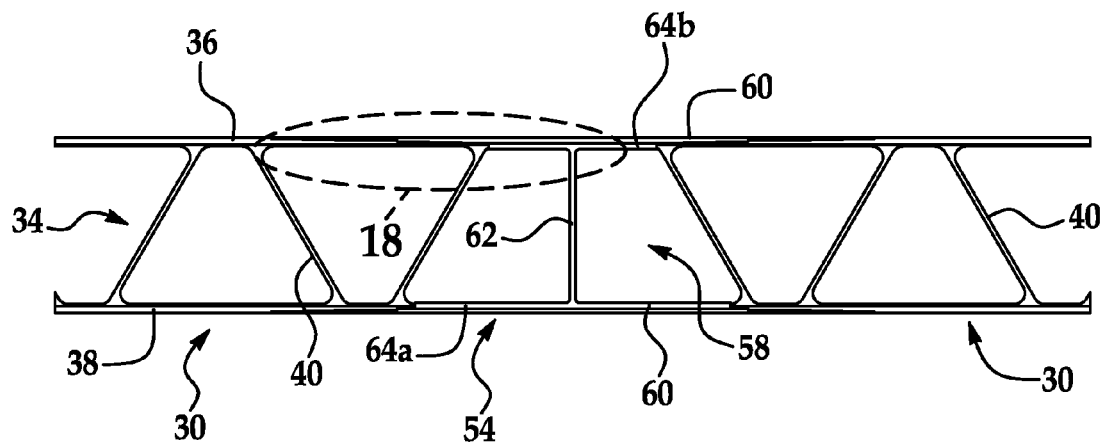
FIG. 17 is an illustration similar to FIG. 15 but showing the scarf splices having been installed in the joint.
Figure 18:
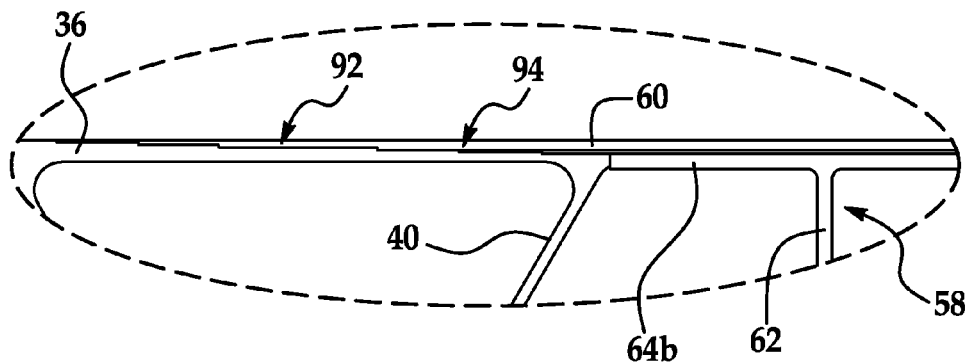
FIG. 18 is an illustration of the area designated as FIG. 18 in FIG. 17.

At 86, the scarf splices 60 are installed over the ramped portions 94 on the facesheets 36, 38, covering the stiffener insert 58, as shown in FIGS. 17 and 18. The installed scarf splices 60 may be vacuum compacted against the facesheets 36, 38 and the stiffener insert 58, and the adhesive film 66 may be cured out-of-autoclave using heat tape (not shown) or the like, in order to hot bond the joint 54. In one exemplary embodiment, bond temperatures typically may be between approximately 250 and 350 degrees F., and bonding pressure may be in the range between approximately 15 and 100 PSI. The bonding pressure can be applied by a vacuum bag, autoclave, rubber bladder or strongback press (all not shown). Mandrels (not shown) may be installed in the flutes 40 to support them during the compaction process, and removed when the hot bonding is completed.

Figure 19:
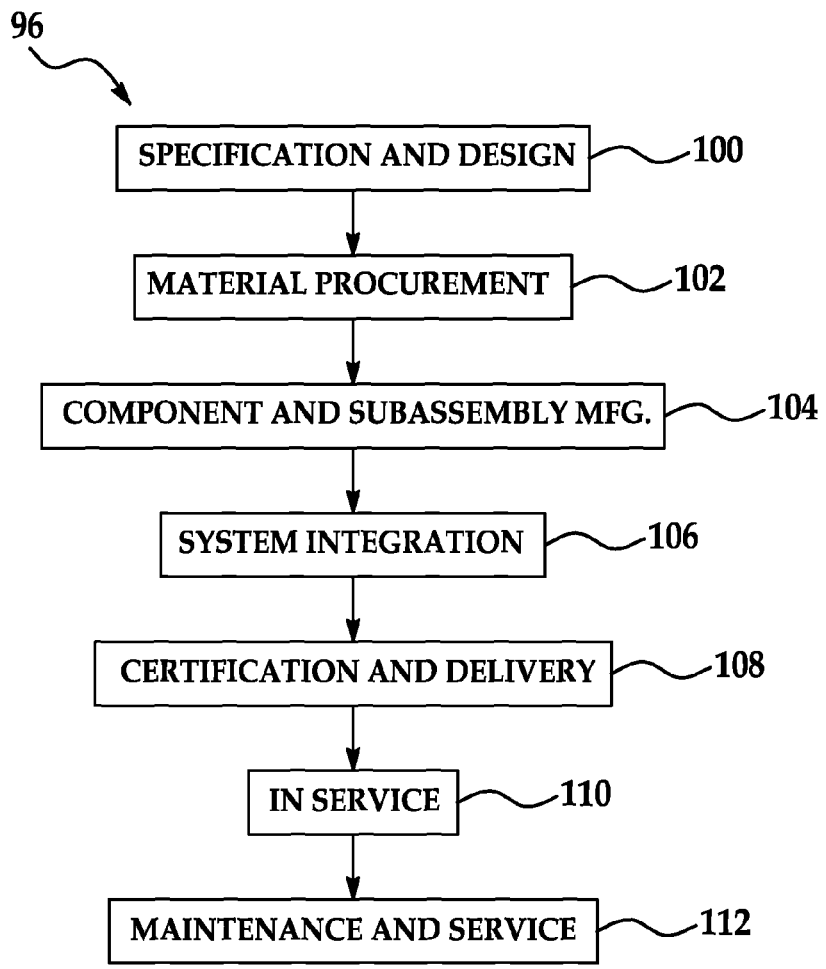
FIG. 19 is a flow diagram of aircraft production and service methodology.
Figure 20:
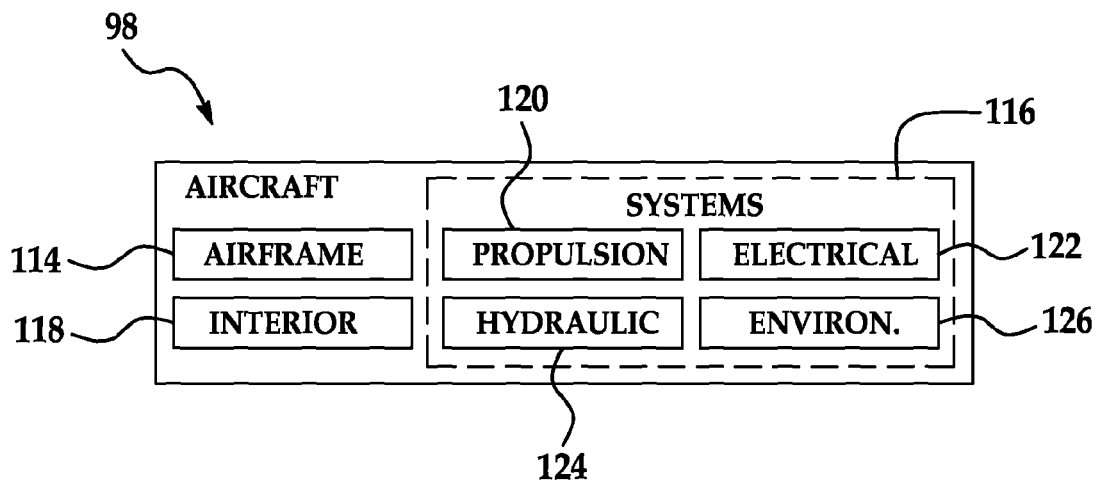
FIG. 20 is a block diagram of an aircraft.

Referring next to FIGS. 19 and 20, embodiments of the disclosure may be used in the context of an aerospace manufacturing and service method 96 as shown in FIG. 19 and an aerospace vehicle 98 as shown in FIG. 12. During pre-production, exemplary method 96 may include specification and design 100 of the aerospace vehicle 98 and material procurement 102. During production, component and subassembly manufacturing 104 and system integration 106 of the aircraft 98 takes place. During step 104, the disclosed method and apparatus may be employed to fabricate composite parts such as fuselage sections and fuel tanks which are then assembled at step 106. Thereafter, the aerospace vehicle 98 may go through certification and delivery 108 in order to be placed in service 110. While in service by a customer, the aerospace vehicle 98 may be scheduled for routine maintenance and service 110 (which may also include modification, reconfiguration, refurbishment, and so on).

Each of the processes of method 96 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aerospace vehicle 98 produced by exemplary method 96 may include an airframe 114 with a plurality of systems 116 and an interior 118. The disclosed method and apparatus may be employed to fabricate fuselage sections which form part of the airframe 114. Examples of high-level systems 116 include one or more of a propulsion system 120, an electrical system 122, a hydraulic system 124, and an environmental system 126. Any number of other systems may be included. Although an aerospace example is shown, the principles of the invention may be applied to other industries, such as the automotive industry.

The apparatus embodied herein may be employed during any one or more of the stages of the production and service method 96. For example, components or subassemblies corresponding to production process 104 may be fabricated or manufactured in a manner similar to components or subassemblies produced while the aerospace vehicle 98 is in service. Also, one or more apparatus embodiments may be utilized during the production stages 104 and 106, for example, by substantially expediting assembly of or reducing the cost of an aerospace vehicle 98. Similarly, one or more apparatus embodiments may be utilized while the aerospace vehicle 132 is in service, for example and without limitation, to maintenance and service 112.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of fabricating a composite structure, comprising:
    forming first and second panels each having a fluted core and an end, the first and second panels each having a core sandwiched between first and second facesheets, the core comprising a support between the first and second facesheets, the fluted cores being mismatched at the first and second panel ends, creating mismatched cores, the first and the second panels each comprising a truss panel having a fluted core, the fluted core being a series of hollow isosceles trapezoidal flutes with inclined side walls extending traverse to a plane of the first and second face sheets;
    altering the first and second panel ends to match-up the mismatched cores, so as to form altered panel ends, the altering including removing at least a portion of the flutes between the first and second facesheets;
    installing a composite core stiffener insert between the altered panel ends, the composite core stiffener comprising a plurality of fibers that form a web and a set of flanges, the set of flanges adhered to the first panel and the second panel, the web comprising a substantially straight portion extending between the first panel and the second panel such that the set of flanges contact an inner surface of the first panel and an inner surface of the second panel; and
    joining the altered panel ends together at a joint.

2. The method of claim 1, wherein altering the first and second panel ends includes removing a portion of the end of the core of at least one of the altered panel ends, such that the altered panel ends are matched.

3. The method of claim 1, wherein the core stiffener insert is configured to mate with the cores of the first and second panels such that the set of flanges do not extend past the inner surface of the first and second panels.

4. The method of claim 1, wherein the composite core stiffener insert is a substantially 90 degree I-beam relative to a surface of the panel.

5. The method of claim 1, wherein the composite core stiffener insert is substantially symmetric about a centerline passing through the joint.

6. The method of claim 1, wherein the composite core stiffener insert is bonded to portions of the cores of the first and second panels.

7. The method of claim 1, wherein the joint further includes first and second scarf splices each substantially flush with a surface of each panel.

8. The method of claim 7, wherein the first scarf splice joins a first facesheet of first and second panels, and the second scarf splice joins a second facesheet of the first and second panels.

9. The method of claim 7, wherein each of the scarf splices is joined to the core stiffener insert.

10. The method of claim 7, wherein the core stiffener insert is adhesively bonded to the fluted core of each of the panels and to each of the first and second scarf splices.

11. The method of claim 7, wherein the joint further includes scarf slices bonded to the core stiffener insert and to facesheets of the first and second panels.

12. A method of fabricating a composite structure, comprising:
    providing a first and a second composite panel, the first composite panel having an end and the second composite panel having an end each composite panel having a core sandwiched between first and second facesheets, each of the cores comprising a support between the first and second facesheets, the ends of the cores being mismatched, creating mismatched core ends, the first and the second panels each comprising a truss panel having a fluted core, the fluted core being a series of hollow isosceles trapezoidal flutes with inclined side walls extending traverse to the plane of the first and second face sheets;
    altering each of the ends of the composite panels, including removing at least a portion of the flutes between the first and second facesheets of each composite panel;
    installing a composite core stiffener insert between the mismatched core ends, the composite core stiffener comprising a plurality of fibers that form a web and a set of flanges, the web comprising a substantially straight portion;
    bonding the set of flanges the first panel and the second panel such that the set of flanges do not extend past the first panel and the second panel; and
    joining the panel ends along joints with the core stiffener insert that mates the mismatched core ends and transfers load between the facesheets and across the panels.

13. The method of claim 12, further comprising:
    matching the mismatched core ends to the core stiffener insert by removing at least a portion of one of the mismatched core ends.

14. The method of claim 12, further comprising:
    removing material from a first exterior surface of a first panel and a second panel to form a first ramp where the a first panel meets the second panel;
    removing material from a second exterior surface of the first panel and the second panel to form a second ramp where the a first panel meets the second panel;
    installing a first splice over the first ramp between the first facesheets of the panels, and
    installing a second splice over the second ramp between the second facesheets of the panels.

15. The method of claim 14, further comprising:
    bonding each of the first and second splices with the core stiffener insert.

16. The method of claim 12 further comprising forming a scarf in at least one panel substantially flush with a surface of the at least one panel.

17. The method of claim 12, wherein the core comprises a fluted core.

18. A method of fabricating a composite barrel section for aerospace applications, comprising:

forming a plurality of curved sandwich panels each having a fluted core sandwiched between a pair of face sheets, each core of each panel comprising a support between the first and second facesheets, the sandwich panels including a first and a second panel each comprising a truss panel having a fluted core, the fluted core being a series of hollow isosceles trapezoidal flutes with inclined side walls extending traverse to the plane of the first and second face sheets;

altering each of the ends of the first and second panels, including removing at least a portion of the flutes between the first and second facesheets of each composite panel;

joining ends of the panels together along joints;

trimming the ends of the panels at a final joint between the panel to form a preselected inter-panel gap;

scarfing facesheets in an area of the inter-panel gap, creating scarfed facesheets;

fabricating and pre-curing a pair of composite laminate scarf splices;

fabricating and precuring a composite core stiffener insert, the composite core stiffener insert comprising a plurality of fibers that form a web and a set of flanges, the web comprising a substantially straight portion;

installing the stiffener insert in the inter-panel gap;

applying a film adhesive over the combination of the scarfed facesheets and the insert;

bonding the set of flanges to an inner surface of a first panel and an inner surface of the second panel;

placing the scarf splices on the scarfed facesheets;

compacting the scarf splices against the facesheets; and hot bonding the joint, including curing the film adhesive.

19. The method of claim 18, wherein the composite core stiffener is positioned at substantially 90 degrees relative to the face sheets.

20. The method of claim 18, wherein the composite core stiffener comprise radius corners at opposing ends, and further comprising filling a void defined by the radius corners.

* * * * *